United States Patent
Li et al.

(10) Patent No.: US 11,441,521 B2
(45) Date of Patent: Sep. 13, 2022

(54) VANED VALVE FOR EXHAUST GAS RECIRCULATION LINE

(71) Applicants: VOLVO TRUCK CORPORATION, Gothenburg (SE); Jian Li, Hagerstown, MD (US); John Lowe, Bedford, PA (US)

(72) Inventors: Jian Li, Hagerstown, MD (US); John Lowe, Bedford, PA (US)

(73) Assignee: VOLVO TRUCK CORPORATION, Gothenburg (SE)

( * ) Notice: Subject to any disclaimer, the term of this patent is extended or adjusted under 35 U.S.C. 154(b) by 464 days.

(21) Appl. No.: 16/627,309

(22) PCT Filed: Aug. 15, 2017

(86) PCT No.: PCT/US2017/046841
§ 371 (c)(1),
(2) Date: Dec. 29, 2019

(87) PCT Pub. No.: WO2019/035806
PCT Pub. Date: Feb. 21, 2019

(65) Prior Publication Data
US 2020/0173400 A1 Jun. 4, 2020

(51) Int. Cl.
*F02M 26/71* (2016.01)
*F02M 26/68* (2016.01)
(Continued)

(52) U.S. Cl.
CPC ............ *F02M 26/71* (2016.02); *F02M 26/68* (2016.02); *F02M 26/16* (2016.02); *F02M 26/21* (2016.02); *F02M 26/53* (2016.02); *F02M 26/69* (2016.02)

(58) Field of Classification Search
CPC ........ F02M 26/71; F02M 26/68; F02M 26/16; F02M 26/21; F02M 26/53; F02M 26/69; F02M 26/66; F16K 47/08; F16K 11/161
(Continued)

(56) References Cited

U.S. PATENT DOCUMENTS

| 3,263,906 A | 8/1966 | Ward |
| 4,823,743 A | 4/1989 | Ansdale |

(Continued)

FOREIGN PATENT DOCUMENTS

| CN | 1066517 C | 5/2001 |
| CN | 102600743 A | 7/2012 |

(Continued)

OTHER PUBLICATIONS

Supplementary European Search Report (dated Nov. 11, 2020) for corresponding European App. EP 17 92 1891.
(Continued)

*Primary Examiner* — Hai H Huynh
(74) *Attorney, Agent, or Firm* — WRB-IP LLP (57) ABSTRACT

A valve for m exhaust gas recirculation Mae in an engine includes a first barrel connectable to a first group of cylinders, a second barrel connectable to a second group of cylinders, and a center barrel between the first and second barrels and connectable to an intake of the engine, A poppet valve with two valve heads mounted on a valve stem is provided to open and close openings between the first and second barrels, with one of the valve beads of the poppet valve opening into the center barrel Vanes are provided in the center barrel to direct flow from the opening by the valve bead that opens into the center barrel toward the outlet opening.

20 Claims, 5 Drawing Sheets

(51) Int. Cl.
*F02M 26/16* (2016.01)
*F02M 26/21* (2016.01)
*F02M 26/53* (2016.01)
*F02M 26/69* (2016.01)

(58) Field of Classification Search
USPC ............ 123/568.17, 568.18, 568.2; 60/605.2
See application file for complete search history.

(56) References Cited

U.S. PATENT DOCUMENTS

| | | |
|---|---|---|
| 5,485,815 A | 1/1996 | Shida |
| 5,662,079 A | 9/1997 | Snider |
| 5,813,762 A | 9/1998 | Fleischli et al. |
| 6,006,732 A | 12/1999 | Oleksiewicz |
| 6,089,019 A | 7/2000 | Roby et al. |
| 6,830,370 B1 | 12/2004 | Uematsu |
| 6,904,897 B1 | 6/2005 | Hrytzak |
| 2006/0081228 A1 | 4/2006 | Keefover et al. |
| 2008/0149198 A1 | 6/2008 | Fuchinoue et al. |
| 2011/0305103 A1 | 12/2011 | McGuire et al. |
| 2013/0248752 A1 | 9/2013 | Sponsky et al. |
| 2014/0301157 A1 | 10/2014 | Glanville |
| 2015/0027426 A1 | 1/2015 | Antoni et al. |

FOREIGN PATENT DOCUMENTS

| | | |
|---|---|---|
| CN | 103314209 A | 9/2013 |
| CN | 203584619 U | 5/2014 |
| CN | 104145110 A | 11/2014 |
| CN | 1050741139 A | 11/2015 |
| DE | 102012101851 A1 | 9/2013 |
| DE | 102015121616 A1 | 6/2017 |
| DE | 102015121617 A1 | 6/2017 |
| JP | 2006233859 A | 9/2006 |
| JP | 2007303434 A | 11/2007 |
| KR | 20070010362 A | 1/2007 |
| WO | 2912987271 A1 | 6/2012 |

OTHER PUBLICATIONS

Chinese Official Action (dated May 8, 2021) for corresponding Chinese App. 201780092682.2.
International Search Report (dated Jan. 12, 2018) far corresponding International App. PCT/US2017/046841.

VANED VALVE FOR EXHAUST GAS RECIRCULATION LINE

BACKGROUND AND SUMMARY

The present invention relates generally to valves and, more particularly, to valves for exhaust gas recirculation lines in engines.

Pumping a working fluid through a valve requires a sufficient driving pressure. In engines that provide for exhaust gas recirculation (EGR), such as diesel engines, the EGR volumetric flow rate (or equivalently the EGR mass flow rate) is largely dependent on the aerodynamic design of the valve. It is known in such EGR systems to use poppet/barrel style valves that tend to exhibit significant total pressure loss due to poor aerodynamic designs which produce complicated fluid dynamics effects.

In a particular EGR valve design, a front barrel is connected to an exhaust line for a front group of cylinders of the engine, and a rear barrel is connected to an exhaust line for a rear group of cylinders. A center barrel is provided between the front and rear barrels and an outlet opening of the center barrel is connected to the intake line of the engine. A poppet valve is provided for simultaneously opening and closing openings between the front barrel and the center barrel and between the rear barrel and the center barrel. Two valve heads are mounted on a common valve stem and are seated in respective valve seats in the openings between the front barrel and the center barrel and between the rear barrel and the center barrel. When the valve opens, the valve head between the front barrel and the center barrel is moved out of its valve seat into the front barrel and the valve head between the rear barrel and the center barrel is moved out of its valve seat into the center barrel. Fluid flow entering the center barrel from the rear barrel tends to be directed upwardly around the valve head away from the outlet opening of the center barrel to impinge against a top wall of the center barrel above the valve head, tending to cause a "dead" or stagnation zone in the corner of the center barrel above the valve head.

The stagnation zone is a major cause of loss of total pressure in this valve. In an illustrative valve, for example, the EGR flow that enters the center barrel from the rear cylinder must flow around the valve head in the center barrel and a portion of the fluid flow is directed upwardly toward a top of the center barrel and impinges the top wall of the center barrel (in a direction that shall be referred to as vertical) where it decelerates to a stagnation point. The flow that impinges the top wall is also deflected by the top wall from its original direction to flow radially around the center barrel in what shall be referred to as a radial wall flow. The radial wall flow accelerates from the stagnation point until some degree of static pressure recovery has occurred throughout a layer of flow along the wall or periphery of the center barrel. Radial wall flows are formed in opposing directions at the top wall of the center barrel and collide with each other as they flow along the walls of the center barrel away from the top of the center barrel and form more deflection regions resulting in the further recirculation of the working fluid flow. It is similar to a typical bend pipe flow and rapidly varied flow can often be observed in different regions of the valve that could extend downstream toward the outlet of the center barrel where strong transverse variations in the velocity distribution and vortex induced turbulent flow are evident as the EGR flow comes around the impingement regions. The total pressure losses suffered in the various regions of the valve tends to be caused by both friction and momentum exchanges due to the impingement of the EGR flow fluid against the wall and the sequential, sudden changes in direction of the flow, resulting in formation of stagnation zones and strong flow separations from the adverse pressure gradient in the wall layer.

It is desirable to reduce pressure drop across EGR valves and enhance mass/volumetric flow.

According to an aspect of the present mention, a valve for an exhaust gas recirculation line in an engine comprises a first barrel having an inlet end for receiving exhaust from a first group of one or more cylinders, a second barrel having an inlet end for receiving exhaust from a second group of one or more cylinders, a center barrel disposed between the first barrel and the second barrel and having an outlet opening for directing exhaust gas toward an intake of the engine, the first barrel and the center barrel being adapted to be in fluid communication through a first inlet opening, and the second barrel and the center barrel being adapted to be in fluid communication through a second inlet opening, and a poppet valve comprising a stem and a first valve head and a second valve head mounted on the stem, a first valve seat against which the first valve head is arranged to be seated in the first barrel around the first inlet opening, and a second valve seat against which the second valve head is arranged to be seated in the center barrel around the second inlet opening, the poppet valve being movable between a closed position in which the first valve head is seated against the first valve seat and the second valve head is seated against the second valve seat and an open position in which the first valve bead is moved in the first barrel away from the first valve seat and the second valve head is moved in the center barrel away from the second valve seat. The center barrel includes one or more vanes arranged to direct flow from the second inlet opening toward the outlet opening.

According to another aspect of the present invention, a valve comprises a valve barrel having an outlet opening for directing fluid out of the valve barrel, a first inlet opening in a first wall of the valve barrel and a second inlet opening in a second wall of the valve barrel, central axes of the first inlet opening and the second inlet opening being substantially perpendicular to a central axis of the outlet opening, and a poppet valve comprising a stem and a first valve head and a second valve head mounted on the stem, a first valve seat against which the first valve head is arranged to be seated outside the valve barrel around the first inlet opening, and a second valve seat against which the second valve head is arranged to be seated in the valve barrel around the second inlet opening, the poppet valve being movable between a closed position in which the first valve head is seated against the first valve seat and the second valve head is seated against the second valve seat and an open position in which the first valve head is moved outside of the valve barrel away from the first valve seat and the second valve head is moved in the valve barrel away from the second valve seal. The valve barrel includes one or more vanes arranged to direct flow from the second inlet opening toward the outlet opening.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 1:
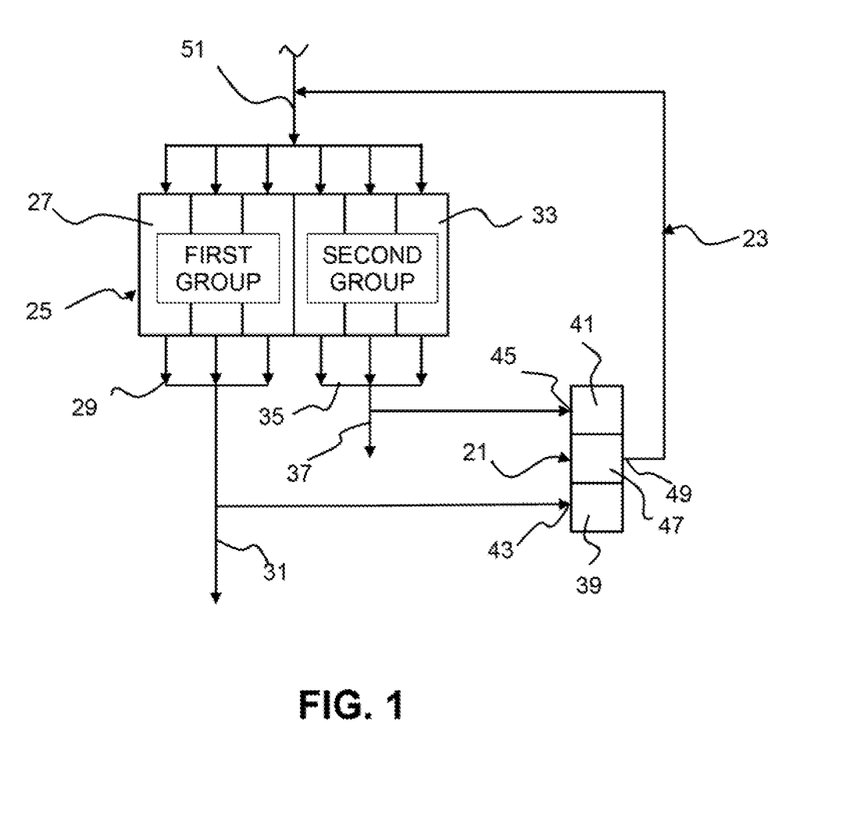
FIG. 1 is a schematic view of an engine including a valve for an exhaust gas recirculation line according to an aspect of the present invention.

A valve 21 for an exhaust gas recirculation line 23 in an engine 25 is provided as seen in FIG. 1. The engine 25 comprises a first group 27 of one or more cylinders connected to a first exhaust manifold 29 leading to a first exhaust line 31 and a second group 33 of one or more cylinders connected to a second exhaust manifold 35 leading to a second exhaust line 37. Such a configuration can be found, for example, in a straight six type engine wherein the first group of cylinders is the front three cylinders and the second group of cylinders is the rear three cylinders, however, the present invention is not limited to use in connection with such engines. The first exhaust manifold 29 and the second exhaust manifold 35 may be separate manifolds connected only to the first group 27 and the second group 33 of one or more cylinders, respectively, or a single manifold that effectively functions to direct exhaust from the first group of one or more cylinders primarily to the first exhaust line and exhaust from the second group of one or more cylinders primarily to the second exhaust line.

The first exhaust line 31 is connected to a first barrel 39 of the valve 21 and the second exhaust line 37 is connected to a second barrel 41 of the valve. The first barrel 39 has an inlet end 43 for receiving exhaust from the first group 27 of one or more cylinders, and the second barrel 41 has an inlet end 45 for receiving exhaust from the second group 33 of one or more cylinders.

A center barrel 47 is disposed between the first barrel 39 and the second barrel 41 and has an outlet opening 49 for directing exhaust gas toward an intake 51 of the engine. The first barrel 39 and the center barrel 47 are adapted to be in fluid communication through a first inlet opening 53. The second barrel 41 and the center barrel 47 are adapted to be in fluid communication through a second inlet opening 55.

Figure 2:
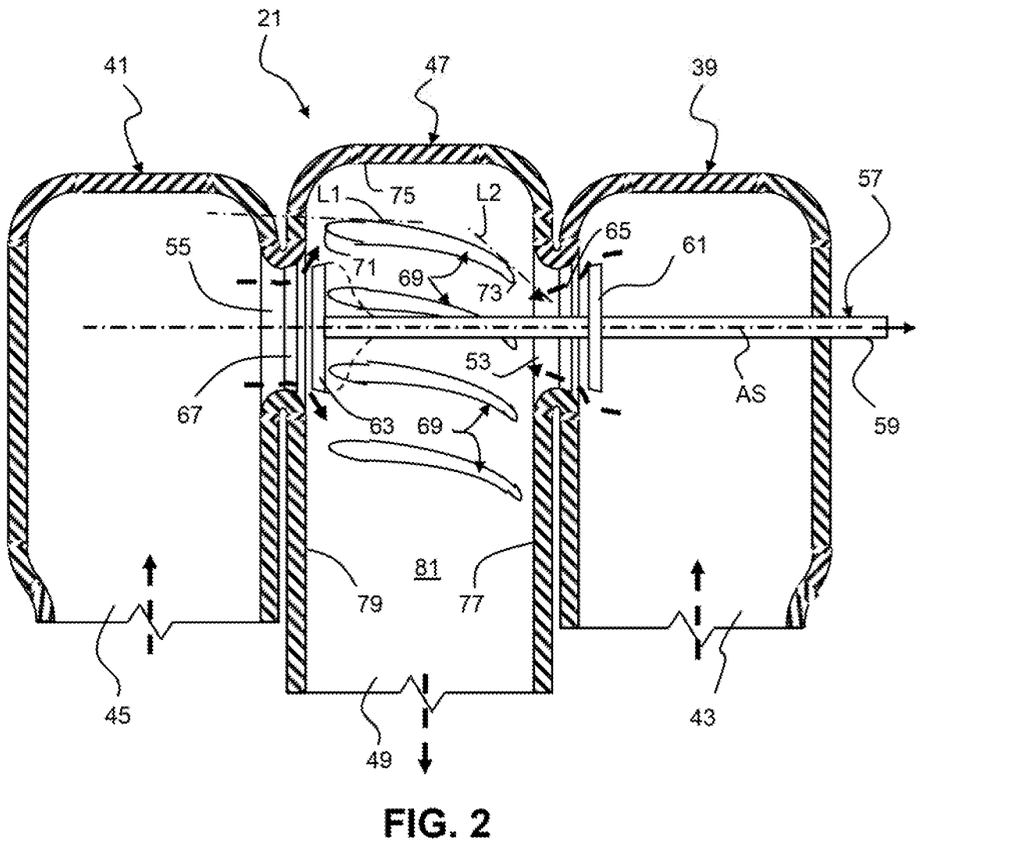
FIG. 2 is a cross-sectional view of a left side of a valve for an exhaust gas recirculation line according to an aspect of the present invention showing the valve in an open condition.
Figure 3:
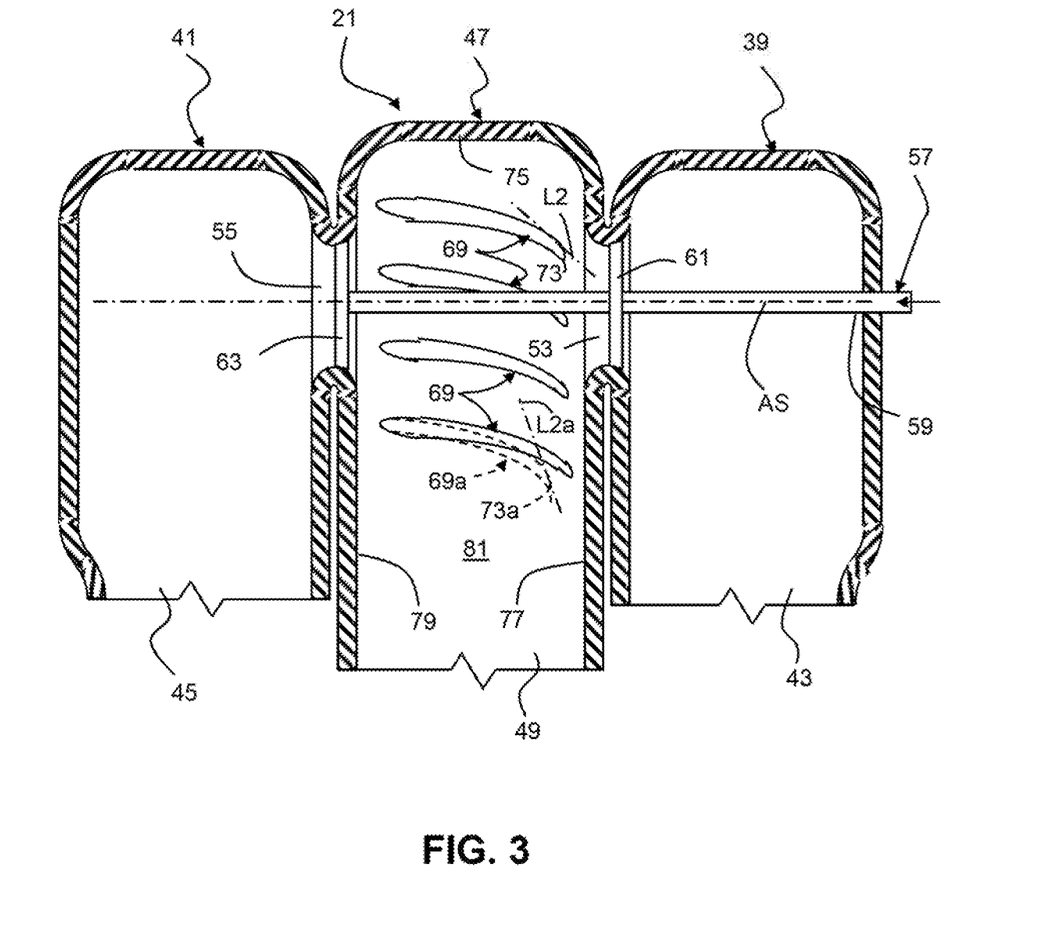
FIG. 3 is a cross-sectional view of a left side of a valve for an exhaust gas recirculation line according to an aspect of the present invention showing the valve in a closed condition.

As seen in FIGS. 2 and 3, a poppet valve 57 comprising a stem 59 and a first valve head 61 and a second valve head 63 mounted on the stem is provided. The poppet valve 57 further includes a first valve seat 65 against which the first valve head 61 is arranged to be seated in the first barrel 39 around the first inlet opening 53, and a second valve seat 67 against which the second valve head 63 is arranged to be sealed in the center barrel 47 around the second inlet opening 55. The first valve seat 65 and the second valve seat 67 may form part or all of the first inlet opening 53 and the second inlet opening 55, respectively. The poppet valve 57 is movable between a closed position as seen in FIG. 3 in which the first valve head 61 is seated against the first valve seat 65 and the second valve head 63 is seated against the second valve seat 67 and an open position as seen in FIG. 2 in which the first valve head is moved in the first barrel 39 away from the first valve seat and the second valve head is moved in the center barrel 47 away from the second valve seat. The poppet valve 57 can be moved back and forth by any suitable means such as by a cam arrangement or by an actuator such as a solenoid.

The center barrel 47 includes one or more vanes 69 arranged to direct flow from the second inlet opening 55 toward the outlet opening 49. Each of the vanes 69 comprises a first end 71 and a second end 73, the first end being closer to the second inlet opening 55 than the first inlet opening 53 and the second end being closer to the outlet opening 49 than the first inlet opening. Each of the vanes 69 typically comprises a continuously curved portion between the first end 71 and the second end 73. A line L1 tangent to the first end 71 is ordinarily substantially parallel, i.e., between about 0° and 10°, to a longitudinal axis AS of the stem 59. A line L2 tangent to the second end 73 ordinarily defines an angle between 10° and 90° to the longitudinal axis AS of the stem 59, more preferably between 20° and 50° to the longitudinal axis of the stem, and more preferably about 30°.

It is presently understood that increasing the curve radius of the vanes 69 (i.e. making them more curved) decreases the sequential total pressure loss in the center barrel 47 due to the change of the direction of the fluid flow from the second opening 55. The curvature of the vanes 69 modulates the momentum of the fluid flow in the center barrel to more advantageously balance the pressure losses between flow-along the curving vanes and flow impinging on what shall be referred to as the vertical or top wall 75 of the center barrel 47. Preferably, parameters controlling the balance are selected such that the wall flow, after it has impinged against the top wall 75, mainly heads in what shall be referred to as a downward direction toward the outlet opening 49 in order to minimize loss of the total pressure. Optimal selection of the dimensions, shape, and/or relative positioning of the steering vanes 69 is likely to vary from application to application but are preferably made such that the momentum of the EGR wall flow is preserved as much as possible on its way from the second valve opening 55 in a gradually downward direction toward the outlet opening 49 following the curving shape of the steering vanes.

Typically, the center barrel 49 comprises two or more vanes 69. As seen in FIGS. 2 and 3, the vanes 69 can all have the same general shape. As seen in phantom in FIG. 3, however, the vanes can be configured so that a line L2a tangent to a second end 73a of at least one 69a of the two or more vanes forms a different angle to the longitudinal axis AS of the stem than a line L2 tangent to a second end 73 of at least one other one 69 of the two or more vanes.

The one or more vanes 69 can be integrally formed with the center barrel 47, such as by being formed together as a cast or molded part, or by deforming a previously formed center barrel. Alternatively, tire one or more vanes 69 can be formed separately from the center barrel 47 and attached to the center barrel by any suitable means, such as by welding or brazing or by mating male and female parts provided on the vanes and the center barrel.

Figure 5:
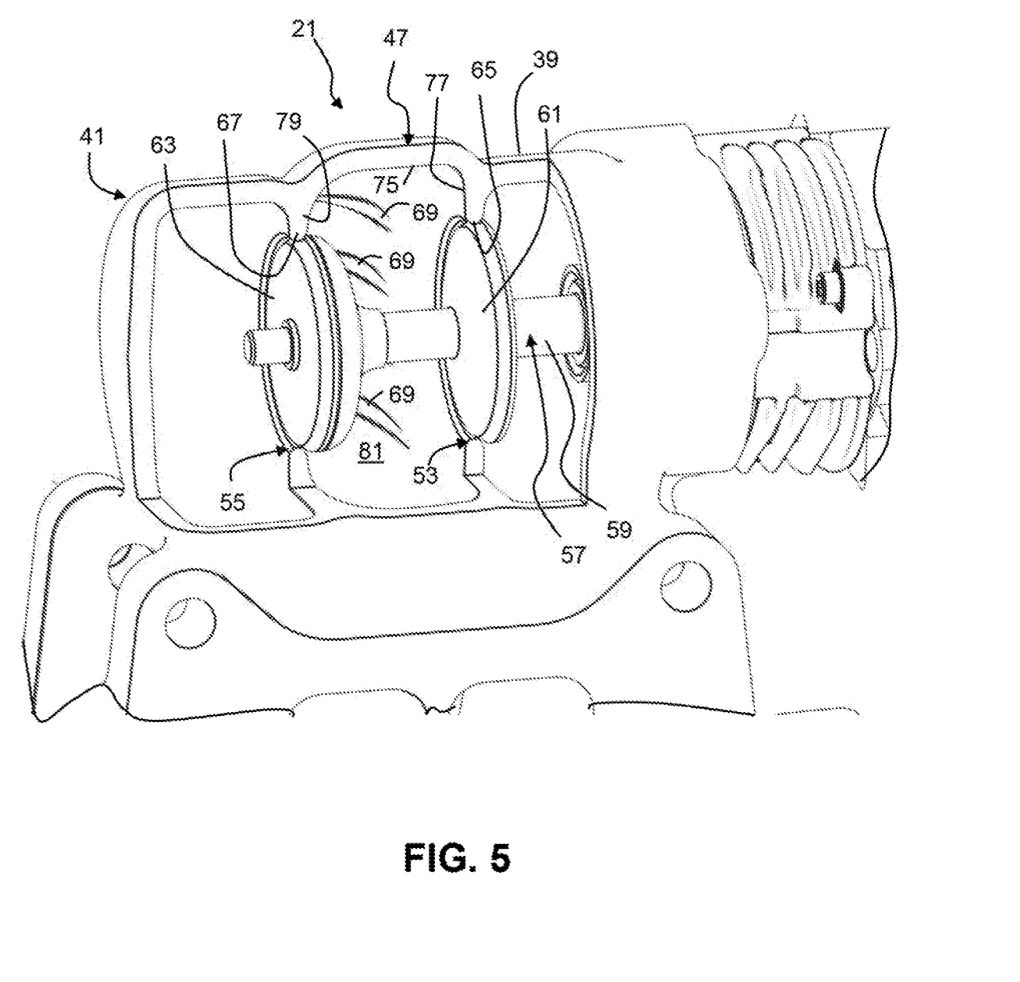
FIG. 5 is a cross-sectional, perspective view of a left side of a valve for an exhaust gas recirculation line according to an aspect of the present invention.

As seen in FIG. 5, the center barrel 47, the first barrel 39, and the second barrel 41 typically have a substantially circular or rounded shape when viewed along the longitudinal axis of the stem 59 and are generally cylindrical, excluding the portions of the first and second barrels constituting the inlet ends 43 and 45 and the portion of the center barrel constituting the outlet opening 49. This shape facilitates minimizing "dead zones" and pressure drop in the center barrel 47 caused by fluid flow exiting the second inlet opening that is directed upward toward the top wall 75 having its direction reversed so that it will then flow toward the outlet opening 49. Provision of the vanes 69 further facilitates minimizing dead zones and pressure drop. The downstream side of the second valve head 63 can be curved as shown in phantom in FIGS. 2 and 3 instead of forming a sharp edge to reduce turbulence in the center barrel and facilitate flow toward the outlet opening 49.

Figure 4:
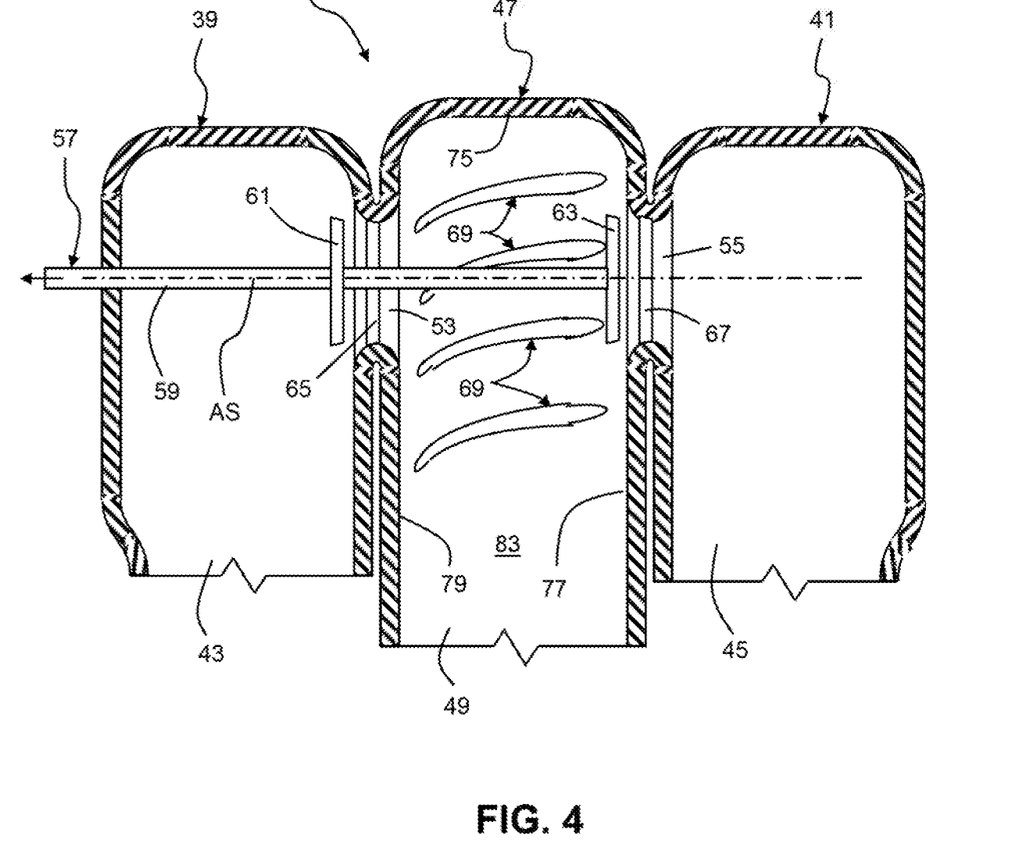
FIG. 4 is a cross-sectional view of a right side of a valve for an exhaust gas recirculation line according to an aspect of the present invention showing the valve in an open condition.

As seen in FIGS. 2-4, the center barrel 47 has a first interior surface 77 in which the first inlet opening 53 is provided, a second interior surface 79 in which the second inlet opening 55 is provided, a top side interior surface 75 between the first interior surface and the second interior surface and opposite the outlet opening, and a left interior surface 81 (FIGS. 2 and 3) and a right interior surface 83 (FIG. 4) between the first interior surface and the second interior surface and between the top interior surface and the outlet opening 49. The one or more vanes 69 are provided in at least one of fie left interior surface 81 and the right interior surface 83, typically both and typically, no vanes are provided in the fop surface 75. As seen by comparing FIGS. 2 and 3 with FIG. 4, when one or more vanes 69 are provided in both of the left interior surface 81 and the right interior surface 83, the one or more vanes in the left interior surface are typically mirror images of the one or more vanes in the right interior surface. When a plurality of vanes 69 are provided in the at least one of the left interior surface 79 and the right interior surface 81, they will typically be spaced evenly and will typically be spaced in the at least one of the left interior surface 79 and the right interior surface over an are between 30° and 120° around the stem in each surface.

The vanes 69 will extend radially inward from the at least one of the left interior surface 81 and the right interior surface 83 by an amount sufficient to provide a positive effect on flow. The height of the vanes 69 above the at least one of the left interior surface 81 and the right interior surface 83 will vary from valve to valve, however, it is presently anticipated that the vanes will typically be between about 5 mm and 15 mm.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. A valve for an exhaust gas recirculation line in an engine, comprising:
   a first barrel having an inlet end for receiving exhaust from a first group of one or more cylinders;
   a second barrel having an inlet end for receiving exhaust from a second group of one or more cylinders;
   a center barrel disposed between the first barrel and the second barrel and having an outlet opening for directing exhaust gas toward an intake of the engine, the first barrel and the center barrel being adapted to be in fluid communication through a first inlet opening, and the second barrel and the center barrel being adapted to be in fluid communication through a second inlet opening; and
   a poppet valve comprising a stem and a first valve head and a second valve head mounted on the stem, a first valve seat against which the first valve head is arranged to be seated in the first barrel around the first inlet opening, and a second valve seat against which the second valve head is arranged to be seated in the center barrel around the second inlet opening, the poppet valve being movable between a closed position in which the first valve head is seated against the first valve seat and the second valve head is seated against the second valve seat and an open position in which the first valve head is moved in the first barrel away from the first valve seat and the second valve head is moved in the center barrel away from the second valve seat,
   wherein the center barrel includes one or more vanes arranged to direct flow from the second inlet opening toward the outlet opening.

2. The valve as set forth in claim 1, wherein the one or more vanes each comprises a first end and a second end, the first end being closer to the second inlet opening than the first inlet opening and the second end being closer to the outlet opening than the first inlet opening.

3. The valve as set forth in claim 2, wherein the one or more vanes each comprises a continuously curved portion between the first end and the second end.

4. The valve as set forth in claim 2, wherein a line tangent to the first end is substantially parallel to a longitudinal axis of the stem.

5. The valve as set forth in claim 4, wherein a line tangent to the second end defines an angle between 10° and 90° to the longitudinal axis of the stem.

6. The valve as set forth in claim 5, wherein the line tangent to the second end defines an angle between 20° and 50° to the longitudinal axis of the stem.

7. The valve as set forth in claim 5, wherein the center barrel comprises two or more vanes, a line tangent to a second end of at least one of the two or more vanes forming a different angle to the longitudinal axis of the stem than a line tangent to a second end of at least one other one of the two or more vanes.

8. The valve as set forth in claim 1, wherein the one or more vanes are integrally formed with the center barrel.

9. The valve as set forth in claim 1, wherein the one or more vanes are formed separately from the center barrel and attached to the center barrel.

10. The valve as set forth in claim 1, wherein the center barrel comprises two or more vanes.

11. The valve as set forth in claim 10, wherein a line tangent to a second end of at least one of the two or more vanes forms a different angle to the longitudinal axis of the stem than a line tangent to a second end of at least one other of the two or more vanes.

12. The valve as set forth in claim 10, wherein a line tangent to a second end of each of the two or more vanes forms a same angle to the longitudinal axis of the stem.

13. The valve as set forth in claim 1, wherein the center barrel has a substantially circular shape.

14. The valve as set forth in claim 1, wherein the center barrel has a first interior surface in which the first inlet opening is provided, a second interior surface in which the second inlet opening is provided, a top side interior surface between the first interior surface and the second interior surface and opposite the outlet opening, and a left interior surface and a right interior surface between the first interior surface and the second interior surface and between the top interior surface and the outlet opening, and wherein one or more vanes is provided in at least one of the left interior surface and the right interior surface.

15. The valve as set forth in claim 14, wherein one or more vanes is provided in both of the left interior surface and the right interior surface.

16. The valve as set forth in claim 15, wherein the one or more vanes in the left interior surface are mirror images of the one or more vines in the right interior surface.

17. The valve as set forth in claim 14, wherein the one or more vanes comprises a plurality of vanes in the at least one of the left interior surface and the right interior surface and spaced over an are between 30° and 120° around the stem.

18. A valve, comprising:
a valve barrel having an outlet opening for directing fluid out of the valve barrel, a first inlet opening in a first wall of the valve barrel and a second inlet opening in a second wall of the valve barrel, central axes of the first inlet opening and the second inlet opening being substantially perpendicular to a central axis of the outlet opening; and
a poppet valve comprising a stem and a first valve head and a second valve head mounted on the stem, a first valve seat against which the first valve head is arranged to be seated outside the valve barrel around the first inlet opening, and a second valve seat against which the second valve head is arranged to be seated in the valve barrel around the second inlet opening, the poppet valve being movable between a closed position in which the first valve head is seated against the first valve seat and the second valve head is sealed against the second valve seat and an open position in which the first valve head is moved outside of the valve barrel away from the first valve seat and the second valve head is moved in the valve barrel away from the second valve seat,
wherein the valve barrel includes one or more vanes arranged to direct flow from the second inlet opening toward the outlet opening.

19. The valve as set forth in claim 18, wherein the one or more vanes each comprises a first end and a second end, the first end being closer to the second inlet opening than the first inlet opening and the second end being closer to the outlet opening than the first inlet opening.

20. The valve as set forth in claim 19, wherein a line tangent to the second end defines an angle between 10° and 90° to the longitudinal axis of the stem.

* * * * *